(12) United States Patent
Pakhomov

(10) Patent No.: US 8,494,857 B2
(45) Date of Patent: Jul. 23, 2013

(54) AUTOMATIC MEASUREMENT OF SPEECH FLUENCY

(75) Inventor: Serguei V. S. Pakhomov, Minneapolis, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 754 days.

(21) Appl. No.: 12/652,535

(22) Filed: Jan. 5, 2010

(65) Prior Publication Data

US 2010/0174533 A1 Jul. 8, 2010

Related U.S. Application Data

(60) Provisional application No. 61/142,788, filed on Jan. 6, 2009.

(51) Int. Cl.
*G10L 17/26* (2013.01)

(52) U.S. Cl.
USPC .......................................... 704/270; 704/271

(58) Field of Classification Search
USPC .................................................. 704/270, 271
See application file for complete search history.

(56) References Cited

U.S. PATENT DOCUMENTS

| | | | |
|---|---|---|---|
| 4,194,590 A | 3/1980 | Anderson et al. |
| 4,490,840 A | 12/1984 | Jones |
| 4,816,994 A | 3/1989 | Freiling et al. |
| 4,852,180 A | 7/1989 | Levinson |
| 4,914,590 A | 4/1990 | Loatman et al. |
| 4,974,191 A | 11/1990 | Amirghodsi et al. |
| 5,040,214 A | 8/1991 | Grossberg et al. |
| 5,163,111 A | 11/1992 | Baji et al. |
| 5,218,529 A | 6/1993 | Meyer et al. |
| 5,228,087 A | 7/1993 | Bickerton |
| 5,278,980 A | 1/1994 | Pedersen et al. |
| 5,331,544 A | 7/1994 | Lu et al. |
| 5,333,275 A | 7/1994 | Wheatley et al. |
| 5,426,745 A | 6/1995 | Baji et al. |
| 5,519,805 A | 5/1996 | King |
| 5,598,510 A | 1/1997 | Castelaz |
| 5,613,013 A | 3/1997 | Schuette |
| 5,623,609 A | 4/1997 | Kaye et al. |
| 5,627,942 A | 5/1997 | Nightingale et al. |
| 5,649,061 A | 7/1997 | Smyth |

(Continued)

OTHER PUBLICATIONS

Pakhomov et al., "Automatic Detection of Rhythm Changes in the Speech of Patients with Fronto-temporal Dementia," Institute for Health Informatics, University of Minnesota, 4 pgs., Minneapolis, MN, 2008.

(Continued)

*Primary Examiner* — Susan McFadden
(74) *Attorney, Agent, or Firm* — Shumaker & Sieffert, P.A.

(57) ABSTRACT

Techniques are described for automatically measuring fluency of a patient's speech based on prosodic characteristics thereof. The prosodic characteristics may include statistics regarding silent pauses, filled pauses, repetitions, or fundamental frequency of the patient's speech. The statistics may include a count, average number of occurrences, duration, average duration, frequency of occurrence, standard deviation, or other statistics. In one embodiment, a method includes receiving an audio sample that includes speech of a patient, analyzing the audio sample to identify prosodic characteristics of the speech of the patient, and automatically measuring fluency of the speech of the patient based on the prosodic characteristics. These techniques may present several advantages, such as objectively measuring fluency of a patient's speech without requiring a manual transcription or other manual intervention in the analysis process.

25 Claims, 7 Drawing Sheets

U.S. PATENT DOCUMENTS

| | | |
|---|---|---|
| 5,652,828 A | 7/1997 | Silverman |
| 5,680,524 A | 10/1997 | Maples et al. |
| 5,717,828 A | 2/1998 | Rothenberg |
| 5,722,418 A | 3/1998 | Bro |
| 5,732,395 A | 3/1998 | Silverman |
| 5,749,071 A | 5/1998 | Silverman |
| 5,751,906 A | 5/1998 | Silverman |
| 5,774,357 A | 6/1998 | Hoffberg et al. |
| 5,774,591 A | 6/1998 | Black et al. |
| 5,799,276 A | 8/1998 | Komissarchik et al. |
| 5,802,220 A | 9/1998 | Black et al. |
| 5,806,028 A | 9/1998 | Lyberg |
| 5,813,862 A | 9/1998 | Merzenich et al. |
| 5,832,435 A | 11/1998 | Silverman |
| 5,870,709 A | 2/1999 | Bernstein |
| 5,875,108 A | 2/1999 | Hoffberg et al. |
| 5,885,083 A | 3/1999 | Ferrell |
| 5,890,117 A | 3/1999 | Silverman |
| 5,914,720 A | 6/1999 | Maples et al. |
| 5,920,477 A | 7/1999 | Hoffberg et al. |
| 5,927,988 A | 7/1999 | Jenkins et al. |
| 5,999,895 A | 12/1999 | Forest |
| 5,999,904 A | 12/1999 | Brown et al. |
| 6,005,549 A | 12/1999 | Forest |
| 6,018,736 A | 1/2000 | Gilai et al. |
| 6,019,607 A | 2/2000 | Jenkins et al. |
| 6,044,347 A | 3/2000 | Abella et al. |
| 6,044,365 A | 3/2000 | Cannon et al. |
| 6,068,485 A | 5/2000 | Linebarger et al. |
| 6,071,123 A | 6/2000 | Tallal et al. |
| 6,085,162 A | 7/2000 | Cherny |
| 6,113,393 A | 9/2000 | Neuhaus |
| 6,115,482 A | 9/2000 | Sears et al. |
| 6,120,298 A | 9/2000 | Jenkins et al. |
| 6,123,548 A | 9/2000 | Tallal et al. |
| 6,128,596 A | 10/2000 | Mackie |
| 6,134,529 A | 10/2000 | Rothenberg |
| 6,146,147 A | 11/2000 | Wasowicz |
| 6,151,571 A | 11/2000 | Pertrushin |
| 6,157,913 A | 12/2000 | Bernstein |
| 6,159,014 A | 12/2000 | Jenkins et al. |
| 6,160,536 A | 12/2000 | Forest |
| 6,166,739 A | 12/2000 | Hugh |
| 6,169,981 B1 | 1/2001 | Werbos |
| 6,181,996 B1 | 1/2001 | Chou et al. |
| 6,208,963 B1 | 3/2001 | Martinez et al. |
| 6,249,606 B1 | 6/2001 | Kiraly et al. |
| 6,256,630 B1 | 7/2001 | Gilai et al. |
| 6,261,101 B1 | 7/2001 | Benitz et al. |
| 6,272,479 B1 | 8/2001 | Farry et al. |
| 6,275,806 B1 | 8/2001 | Pertrushin |
| 6,293,801 B1 | 9/2001 | Jenkins et al. |
| 6,299,452 B1 | 10/2001 | Wasowicz et al. |
| 6,302,697 B1 | 10/2001 | Tallal et al. |
| 6,311,159 B1 | 10/2001 | Van Tichelen et al. |
| 6,327,568 B1 | 12/2001 | Joost |
| 6,334,778 B1 | 1/2002 | Brown |
| 6,338,039 B1 | 1/2002 | Lonski et al. |
| 6,350,128 B1 | 2/2002 | Neuhaus |
| 6,351,273 B1 | 2/2002 | Lemelson et al. |
| 6,353,810 B1 | 3/2002 | Petrushin |
| 6,353,814 B1 | 3/2002 | Weng |
| 6,384,829 B1 | 5/2002 | Prevost et al. |
| 6,386,881 B1 | 5/2002 | Jenkins et al. |
| 6,400,996 B1 | 6/2002 | Hoffberg et al. |
| 6,405,161 B1 | 6/2002 | Goldsmith |
| 6,413,092 B1 | 7/2002 | Tallal et al. |
| 6,413,093 B1 | 7/2002 | Tallal et al. |
| 6,413,094 B1 | 7/2002 | Tallal et al. |
| 6,413,095 B1 | 7/2002 | Tallal et al. |
| 6,413,096 B1 | 7/2002 | Tallal et al. |
| 6,413,097 B1 | 7/2002 | Tallal et al. |
| 6,413,098 B1 | 7/2002 | Tallal et al. |
| 6,421,064 B1 | 7/2002 | Lemelson et al. |
| 6,427,137 B2 | 7/2002 | Petrushin |
| 6,435,877 B2 | 8/2002 | Wasowicz |
| 6,438,523 B1 | 8/2002 | Oberteuffer et al. |
| 6,453,292 B2 | 9/2002 | Ramaswamy et al. |
| 6,463,415 B2 | 10/2002 | St. John |
| 6,480,826 B2 | 11/2002 | Pertrushin |
| 6,511,324 B1 | 1/2003 | Wasowicz |
| 6,526,382 B1 | 2/2003 | Yuschik |
| 6,529,889 B1 | 3/2003 | Bromberg et al. |
| 6,533,584 B1 | 3/2003 | Jenkins et al. |
| 6,567,775 B1 | 5/2003 | Maali et al. |
| 6,581,046 B1 | 6/2003 | Ahissar |
| 6,585,517 B2 | 7/2003 | Wasowicz |
| 6,585,518 B1 | 7/2003 | Jenkins et al. |
| 6,585,519 B1 | 7/2003 | Jenskins et al. |
| 6,587,572 B1 | 7/2003 | Suchenwirth-Bauersachs et al. |
| 6,594,629 B1 | 7/2003 | Basu et al. |
| 6,598,022 B2 | 7/2003 | Yuschik |
| 6,603,491 B2 | 8/2003 | Lemelson et al. |
| 6,606,744 B1 | 8/2003 | Mikurak |
| 6,629,844 B1 | 10/2003 | Jenkins et al. |
| 6,640,145 B2 | 10/2003 | Hoffberg et al. |
| 6,671,818 B1 | 12/2003 | Mikurak |
| 6,676,412 B1 | 1/2004 | Masterson et al. |
| 6,681,031 B1 | 1/2004 | Cohen et al. |
| 6,690,268 B2 | 2/2004 | Schofield et al. |
| 6,697,457 B2 | 2/2004 | Petrushin |
| 6,718,232 B2 | 4/2004 | Fujita et al. |
| 6,755,657 B1 | 6/2004 | Wasowicz |
| 6,789,054 B1 | 9/2004 | Makhlouf |
| 6,816,836 B2 | 11/2004 | Basu et al. |
| 6,823,312 B2 | 11/2004 | Mittal et al. |
| 6,829,603 B1 | 12/2004 | Chai et al. |
| 6,850,252 B1 | 2/2005 | Hoffberg |
| 6,868,422 B2 | 3/2005 | Turner et al. |
| 6,874,127 B2 | 3/2005 | Newell et al. |
| 6,882,992 B1 | 4/2005 | Werbos |
| 6,884,078 B2 | 4/2005 | Wiig et al. |
| 6,889,216 B2 | 5/2005 | Nugent |
| 6,903,723 B1 | 6/2005 | Forest |
| 6,910,027 B2 | 6/2005 | Bromberg et al. |
| 6,937,975 B1 | 8/2005 | Elworthy |
| 6,944,603 B2 | 9/2005 | Bergan et al. |
| 6,950,534 B2 | 9/2005 | Cohen et al. |
| 6,963,839 B1 | 11/2005 | Ostermann et al. |
| 6,963,841 B2 | 11/2005 | Handal et al. |
| 6,964,023 B2 | 11/2005 | Maes et al. |
| 6,971,993 B2 | 12/2005 | Fletcher |
| 6,982,635 B2 | 1/2006 | Obradovich |
| 6,993,381 B2 | 1/2006 | Connolly et al. |
| 6,995,649 B2 | 2/2006 | Nugent |
| 7,006,881 B1 | 2/2006 | Hoffberg et al. |
| 7,007,001 B2 | 2/2006 | Oliver et al. |
| 7,007,067 B1 | 2/2006 | Azvine et al. |
| 7,023,979 B1 | 4/2006 | Wu et al. |
| 7,028,017 B2 | 4/2006 | Nugent |
| 7,036,128 B1 | 4/2006 | Julia et al. |
| 7,039,619 B2 | 5/2006 | Nugent |
| 7,062,220 B2 | 6/2006 | Haynes et al. |
| 7,062,441 B1 | 6/2006 | Townshend |
| 7,076,472 B2 | 7/2006 | Addison |
| 7,079,986 B2 | 7/2006 | Sicracki |
| 7,089,188 B2 | 8/2006 | Logan et al. |
| 7,091,976 B1 | 8/2006 | Ostermann et al. |
| 7,098,788 B2 | 8/2006 | Giraldo et al. |
| 7,107,252 B2 | 9/2006 | Nugent |
| 7,113,848 B2 | 9/2006 | Hanson |
| 7,124,101 B1 | 10/2006 | Mikurak |
| 7,129,857 B1 | 10/2006 | Spirkovska |
| 7,129,932 B1 | 10/2006 | Klarlund et al. |
| 7,130,807 B1 | 10/2006 | Mikurak |
| 7,136,710 B1 | 11/2006 | Hoffberg et al. |
| 7,139,706 B2 | 11/2006 | Yuschik |
| 7,187,790 B2 | 3/2007 | Sabol et al. |
| 7,194,411 B2 | 3/2007 | Slotznick et al. |
| H2187 H | 4/2007 | Yuchimiuk |
| 7,203,648 B1 | 4/2007 | Ostermann et al. |
| 7,203,649 B1 | 4/2007 | Linebarger et al. |
| 7,203,910 B1 | 4/2007 | Hugh et al. |
| 7,209,923 B1 | 4/2007 | Cooper |
| 7,211,050 B1 | 5/2007 | Caplygin |
| 7,231,395 B2 | 6/2007 | Fain et al. |
| 7,234,942 B2 | 6/2007 | Hu et al. |

| | | |
|---|---|---|
| 7,243,130 B2 | 7/2007 | Horvitz et al. |
| 7,261,182 B2 | 8/2007 | Zainea |
| 7,263,530 B2 | 8/2007 | Hu et al. |
| 7,267,652 B2 | 9/2007 | Coyle et al. |
| 7,272,575 B2 | 9/2007 | Vega |
| 7,275,032 B2 | 9/2007 | Macleod |
| 7,277,752 B2 | 10/2007 | Matos |
| 7,280,964 B2 | 10/2007 | Wilson et al. |
| 7,286,793 B1 | 10/2007 | Miele |
| 7,305,381 B1 | 12/2007 | Poppink et al. |
| 7,307,509 B2 | 12/2007 | Chriss |
| 7,314,444 B2 | 1/2008 | Buschke |
| 7,319,958 B2 | 1/2008 | Melnar et al. |
| 7,319,992 B2 | 1/2008 | Gaos |
| 7,321,854 B2 | 1/2008 | Sharma et al. |
| 7,327,505 B2 | 2/2008 | Fedorovskaya et al. |
| 7,333,963 B2 | 2/2008 | Widrow et al. |
| 7,337,158 B2 | 2/2008 | Fratkina et al. |
| 7,349,782 B2 | 3/2008 | Churchill et al. |
| 7,365,651 B2 | 4/2008 | Massey et al. |
| 7,455,522 B2 * | 11/2008 | Polanyi et al. ............ 434/178 |
| 7,680,056 B2 | 3/2010 | Keyhl et al. |
| 2007/0213982 A1 * | 9/2007 | Xi et al. .................. 704/243 |

OTHER PUBLICATIONS

Wightman et al., "Automatic labeling of prosodic patterns," IEEE Transactions on Speech and Audio Processing, vol. 2, pp. 469-481, Oct. 1994.

Wightman et al,, "Automatic, recognition of prosodic phrases," in International Conference on Acoustics, Speech, and Signal Processing, Toronto, Canada, 1991.

Hosom et al., "Diagnostic Assessment of Childhood Apraxia of Speech Using Automatic Speech Recognition (ASR) Methods," J. Med. Speech Lang Pathol. 12(4); pp. 167-171, Dec. 2004.

Roark et al., "Automatically Derived Spoken Language Markers for Detecting Mild Cognitive Impairment," 4 pgs., 2007.

John-Paul Hosom, "Automatic Phoneme Alignment Based on Acoustic-Phonetic Modeling," 4 pages, 2002.

Pakhomov et al., "Semi-Automatic Analysis of Spontaneous Verbal Descriptions Given by Adults with Frontotemporal Dementia," 1 page, 2008.

* cited by examiner

AUTOMATIC MEASUREMENT OF SPEECH FLUENCY

This application claims the benefit of U.S. Provisional Application No. 61/142,788, filed Jan. 6, 2009, which is hereby incorporated by reference in its entirety.

TECHNICAL FIELD

This disclosure relates to computerized language recognition systems.

BACKGROUND

Researchers and others have used computers to receive speech in a variety of contexts. For example, computers have been programmed to receive a person's speech and transcribe the speech into an electronic document (i.e., speech-to-text). Speech-to-text programs often require that the speaker read one or more prepared documents to the computer. The computer then aligns the spoken portion with the text to develop a model of the speaker's voice. When a new speaker uses the program, the new speaker must read the prepared documents before the speech-to-text program will work effectively.

Another instance of computerized speech recognition involves a human operator who transcribes a speaker's dialog. The operator then inputs the transcription and a recording of the audio to a computer that then processes the recorded audio in light of the transcription. The speaker may therefore speak spontaneously, but human intervention is required in the form of the transcription.

In general, computerized speech recognition programs utilize a statistical model of a language, such as the English language, based on common words of that language. Computerized speech recognition programs are often constructed to recognize particular words of the language and to ignore other sounds or parts of speech. In this manner, these recognition programs accept recognized words and reject other sounds, such as mumbled speech or a cough or other non-linguistic sound. These speech recognition programs discard disfluencies, such as silent pauses, filled pauses (e.g., "umm" or "ahh"), and false starts, to create a text document that does not include such disfluencies.

SUMMARY

In general, techniques are described for automating speech analysis. In one embodiment, an analysis system collects data from a patient's speech regarding prosodic characteristics of the patient's speech. The patient may have a speech impairment, such as aphasia caused by fronto-temporal dementia (FTD), Alzheimer's disease or a precursor thereof, schizophrenia, epilepsy, autism spectrum disorders including Asperger's syndrome, side effects caused by medication, or other impairments. The data may be automatically analyzed to determine, for example, fluency of a patient's speech. The system analyzes a recorded audio sample of the patient's speech to automatically identify locations of phonemes and disfluencies of the audio sample. The system then identifies, for example, silent pauses, filled pauses, repetition of phonemes, or intonation to measure fluency of the patient's speech.

In one embodiment, a method includes receiving an audio sample that includes speech of a patient, analyzing the audio sample to identify prosodic characteristics of the speech of the patient; and automatically measuring fluency of the speech of the patient based on the prosodic characteristics.

In another embodiment, a system includes a speech analyzer to analyze an audio sample including speech of a patient to automatically measure fluency of the speech of the patient, and model data that includes at least one model of a characteristic of a language spoken by the patient.

In another embodiment, a computer-readable medium contains instructions. The computer-readable medium may be a computer-readable storage medium. The instructions may be executed, e.g., by a programmable processor, to cause the processor to receive an audio sample that includes speech of a patient, analyze the audio sample to identify prosodic characteristics of the speech of the patient, and measure fluency of the speech of the patient based on the prosodic characteristics.

In another embodiment, a method includes providing an audio sample that includes speech of a patient to a speech analysis device, wherein the speech analysis device analyzes the audio sample to identify prosodic characteristics of the speech of the patient and automatically measures fluency of the speech of the patient based on the prosodic characteristics, and receiving an indication of the fluency of the speech of the patient from the speech analysis device.

The techniques described herein may present several advantages. For example, the techniques may provide for automatic analysis of fluency of a patient's speech. Thus a patient's speech may be analyzed without, for example, a manual transcription thereof. The techniques therefore provide for automatic analysis of spontaneous speech from the patient. The prosodic characteristics (e.g., silent pauses, filled pauses, repetition, fundamental frequency, etc.) of the patient's speech may also be measured objectively and automatically.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
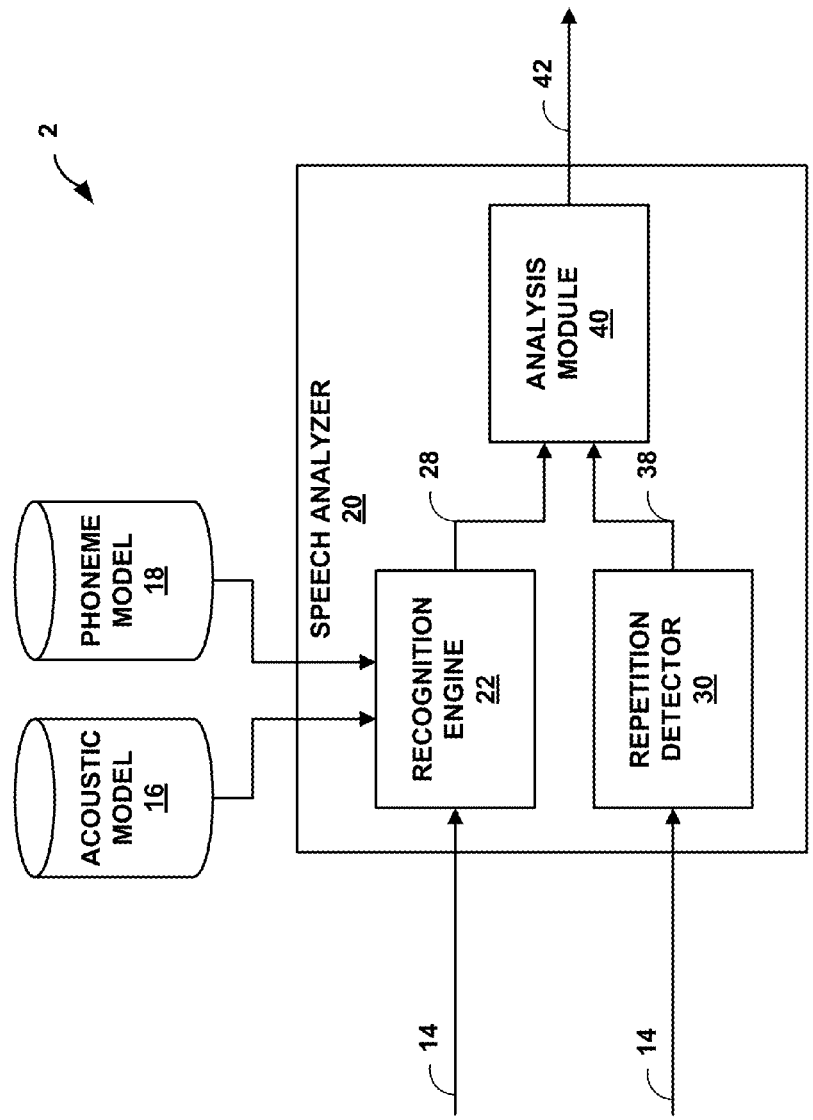
FIG. 1 is a block diagram illustrating an example system for automatically collecting and analyzing speech data.

FIG. 1 is a block diagram illustrating example system 2 for automatically collecting and analyzing speech data. System 2 includes speech analyzer 20 that analyzes input audio 14 to produce speech analysis 42 as output. Speech analyzer 20 may also be referred to as a "speech analysis device" in this disclosure. System 2 also includes models of various parts of speech, sound, and language, such as acoustic model 16 and phoneme model 18. Audio 14 generally includes an audio sample of speech from a patient. Audio 14 may be, for example, an audio recording, live speech from a patient, a data file, or other input format that includes a sample of speech from a patient. Speech analyzer 20 may receive audio 14 through a microphone, from an interface to a sound recorder, from a database or other data storage system, or by other means. Audio 14 may include continuous, spontaneous speech from the patient.

In one embodiment, speech analyzer 20 may be a module of a computing device, such as a server computer or a workstation computer. In another embodiment, speech analyzer 20 may be a module of a stand-alone analysis device. All or part of speech analyzer 20 may be implemented in hardware, software, firmware, or any combination thereof. Speech analyzer 20 receives and analyzes audio 14 to produce speech analysis 42. In particular, speech analyzer 20 identifies various elements of audio 14 relating to fluency of speech therein, such as identifying silent pauses, filled pauses, false starts, repetitions, intonation, or other speech elements related to fluency.

Speech analyzer 20 operates to automatically analyze speech of audio 14. That is, speech analyzer 20, in one embodiment, does not require the assistance of a human user to identify elements of speech of audio 14. Instead, speech analyzer 20 identifies phonemes and locations of phonemes within audio 14 without the aid of a human-made transcription of audio 14. In this manner, speech analyzer 20 automatically produces speech analysis 42 that includes a measurement of a patient's speech fluency from prosodic characteristics of the patient's speech.

In the example of FIG. 1, speech analyzer 20 includes recognition engine 22 and repetition detector 30. An example embodiment of recognition engine 22 is described in greater detail with respect to FIG. 2. In general, recognition engine 22 identifies elements of the patient's speech of audio 14, such as phonemes and pauses. Repetition detector 30 identifies repeated sounds or words of the patient's speech of audio 14. In one embodiment, repetition detector 30 may also identify a fundamental frequency of the patient's speech. In another embodiment, speech analyzer 20 may include an additional module for identifying intonation of the patient's speech of audio 14. Repetition detector 30 may use the identified fundamental frequency to hypothesize as to the patient's intonation. Repetition detector 30 is discussed in greater detail with respect to FIG. 3. Recognition engine 22 and repetition detector 30 each receive audio 14 in a raw form to perform their respective analyses, as discussed in greater detail below.

Recognition engine 22 sends output 28 to analysis module 40, and repetition detector 30 sends output 38 to analysis module 40. Analysis module 40 measures fluency of the patient's speech from the results received from recognition engine 22 and repetition detector 30. In one embodiment, analysis module 40 normalizes the various measurements, e.g., the number of pauses, the number of repetitions, etc. to the duration of audio 14. In another embodiment, analysis module 40 may normalize the measurements by calculating a standard score (a "z-score") that represents the proportion of the difference between each individual measurement (e.g., a specific silent pause duration) and the speaker's or the sample's mean for that measurement (e.g., mean silent pause duration) to the standard deviation of the mean. The resulting measurement is computed as the mean of individual z-scores. That is, analysis module 40 may use the standard z-score formula z_score=([measurement_sample_mean]/[sample_standard_deviation]). Analysis module 40 may also perform normalization using other available methods, for example, methods discussed in C. Wightman and M. Ostendorf, "Automatic recognition of prosodic phrases," in *International Conference on Acoustics, Speech, and Signal Processing* Toronto, Canada, 1991, and C. Wightman and M. Ostendorf, "Automatic labeling of prosodic patterns," *IEEE Transactions on Speech and Audio Processing*, vol. 2, pp. 469-81, 1994, both of which are incorporate herein by reference.

Analysis module 40 generates speech analysis 42 as output, which analysis module 40 may output in one or more various formats such as, for example, a flat file, a report, data saved to a database, data sent to other modules for further analysis or reporting (as discussed with respect to, for example, FIG. 4), or in other formats. Speech analysis 42 may include, for example, a number of silent pauses, a number of filled pauses, a total number of pauses (silent and filled), a mean or median length of pauses (silent, filled, or both), a standard deviation for the length of pauses, a ratio of total pause time to audio time (i.e., the total time of audio 14), a number of repetitions, and/or other values. These measurements may be normalized to the duration of audio 14 for the purposes of analysis or diagnosis. Speech analysis may also include analyzing the distribution of prosodic events (e.g. silent and filled pauses) and other speech events as a time series to construct models of the observed variation in the fluency of speech. The time series models may be periodic (e.g. a sinusoidal model globally predictive of alternating periods of hesitant and fluent speech at regular intervals), or aperiodic (e.g. a Markov model able to predict the fluency of a given segment of speech based on the observed fluency in the local immediately surrounding context). Such analysis may be helpful in identifying and measuring the deviation of the model parameters established in a population with a cognitive disorder from a healthy population.

Systems and devices embodying the techniques of this disclosure, such as system 2, may be used in a variety of contexts. In one example, system 2 may be used as part of a clinical study to determine the effectiveness of various therapies, such as drug therapies, in treating disorders that affect a patient's speech fluency. In such examples, a first group of patients is administered a controlled drug dosage and a second group of patients is administered a placebo. Therapists or clinicians, unaware of which group has been administered the placebo and which has been administered the drug, observe patients of both groups using system 2 and record speech fluency for the patients. An indication that the group of patients who were administered the drug had a higher speech fluency by a statistically significant margin than the group of patients who were administered the placebo would tend to indicate that the drug is effective at treating the disease.

In another example, system 2 may be used to monitor an individual patient or a group of patients over time. A clinician may obtain a baseline speech fluency value for a patient at an initial meeting and observe the patient or patients over time to determine the effectiveness of one or more therapies, and/or to monitor the progression of an ailment. The clinician may also use the baseline speech fluency value to prescribe an initial drug dosage to the patient, and then monitor the patient's speech fluency over time to determine whether to increase or decrease the dosage, or whether to prescribe a different drug to the patient. The clinician may also use the speech fluency values over time to prescribe therapy regimens, such as, for example, particular days on which to take particular dosages of drug, drug infusion patterns (e.g., times of day when a patient should take the drug), other activities to be performed in combination with taking the drug, or other elements of the therapy regimen.

In still another example, system 2 may be used to validate or calibrate other systems. For example, system 2 may be used in combination with an electroencephalogram (EEG) or magnetoencephalogram (MEG). In some cases, an EEG or MEG reports variations in high frequency signals for one or more patients relative to a group of healthy patients, and a clinician may not be able to readily determine the origin of the variation. The clinician may utilize system 2 along with the EEG or MEG to provide a possible origin for the signal variation in the patient. That is, the clinician may observe a correlation between the variation in the signals and patients who have a relatively lower speech fluency as reported by system 2. In this manner, the clinician may use the output of system 2 to provide a basis for further researching the variation in the patient's brainwave activity.

Similarly, system 2 may be used in conjunction with another diagnostic tool, such as a variable N-gram overlap test. The N-gram overlap test generally includes having a patient read a paragraph or observe a picture, removing the paragraph or picture from the patient's possession after a period of time, and asking the patient to recite the paragraph or describe the picture. Each N-gram overlap with the original paragraph or expected description of the picture, where an N-gram typically includes one, two, three, or more words, is tallied to produce a score for each N-gram. In general, more overlap, and higher scores in the higher N-gram categories, indicate better recall of the paragraph or picture, which may indicate that the patient is relatively more healthy. System 2 may be used during the variable N-gram overlap test, or as another test performed before or after the variable N-gram overlap test, to provide additional data for assessing the patient's condition.

Clinicians have also observed that younger children with the autism spectrum disorder tend to have distinct intonation and speech patterns. One potentially valuable area of research includes the development of speech models that include prosodic characteristics such as intonation for younger children who are healthy and speech models for children with various disorders, such as autism spectrum disorders. Accordingly, clinicians may develop speech models of children with autism spectrum disorders, and then use system 2 to diagnose autism spectrum disorders in children at an early age.

The system of FIG. 1 may present several advantages. For example, the system of FIG. 1 may automatically analyze fluency of a patient's speech. Thus speech analyzer 20 may analyze speech of audio 14 without, for example, a manual transcription thereof. Audio 14 may also include spontaneous, natural speech from a patient. Accordingly, the prosodic characteristics (e.g., silent pauses, filled pauses, repetition, fundamental frequency, etc.) of the patient's speech may be measured objectively and automatically.

Figure 2:
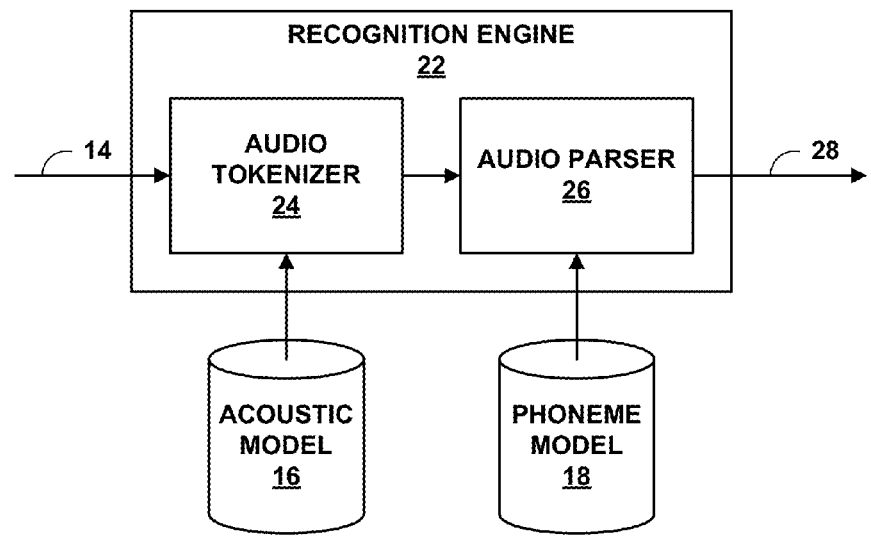
FIG. 2 is a block diagram illustrating an example embodiment of a recognition engine.

FIG. 2 is a block diagram illustrating an example embodiment of recognition engine 22. In the example embodiment of FIG. 2, recognition engine 22 includes audio tokenizer 24 and audio parser 26. Recognition engine 22 receives audio 14 (FIG. 1) as input to analyze. Recognition engine 22 also receives input from acoustic model 26 and phoneme model 28 to analyze audio 14. In one embodiment, recognition engine 22 may utilize the Hidden Markov Toolkit (HTK), available from Cambridge University, Cambridge, England, United Kingdom to analyze audio 14. In other embodiments, recognition engine 22 may utilize other tools to analyze audio 14.

Audio tokenizer 24 produces individual sound units, i.e., "tokens," from audio 14. A token may include, for example, a particular phoneme, silence, or white noise that is not a phoneme. In one embodiment, audio tokenizer 24 may label each token as a phoneme, silence, or white noise. In one embodiment, audio tokenizer 24 identifies a length of each token. Audio tokenizer 24 retrieves data from acoustic model 16 to distinguish phonemes from white noise and silence. Acoustic model 16, in one embodiment, is a model of a general language, such as the English language. Acoustic model 16 is developed from natural dialog, which may include disfluencies such as, for example, silent pauses, filled pauses, false starts, or other disfluencies. In general, audio tokenizer 24 refers to acoustic model 16 to identify where individual phonemes begin and end. Audio tokenizer 24 outputs individual tokens, such as phoneme tokens, silence tokens, and white noise tokens to audio parser 26. In one embodiment, audio tokenizer 24 may discard white noise tokens.

Audio parser 26 identifies the phonemes of phoneme tokens located by audio tokenizer 24. In one embodiment, audio parser 26 distinguishes phonemes from non-speech sounds, such as white noise. Audio parser 26 retrieves data from phoneme model 18 to particularly identify each phoneme token. Phoneme model 18 may include a various number of phonemes. For example, in one embodiment, phoneme model 18 may include two classes of phonemes: vowels and consonants. In another embodiment, phoneme model 18 may include a plurality of phonemes, each corresponding to phonemes of the language that was used to develop acoustic model 16. For example, phoneme model 18 may include a model of over 26 phonemes of the modeled language.

Audio parser 26, in one embodiment, identifies all phonemes of audio 14, even if a phonemic sequence including a particular phoneme does not amount to a meaningful morpheme. Under certain circumstances, a patient may produce a sequence of phonemes that do not form a morpheme, i.e., a sound unit with an identifiable meaning. A patient may produce such a sequence of phonemes as a result of various conditions, such as in response to chemical treatments, neurological conditions, impediments, or for other reasons. In the example embodiment of FIG. 2, audio parser 26 identifies the phonemes in order to fully analyze the patient's speech, regardless of whether the phoneme is part of a meaningful morpheme.

In the example of FIG. 2, audio parser 26 generates output 28. Output 28 includes a representation of audio 14 in the form of a tagged list of symbols. In one embodiment, recognition engine 22 may store output 28 to a database. In another embodiment, recognition engine 22 may store output 28 as a flat file. In another embodiment, recognition engine 22 may send output 28 to analysis module 40 (FIG. 1). In another embodiment, recognition engine 22 may further include an analysis module to perform analysis of output 28. In general, output 28 is a representation of audio 14. For example, output 28 may be written in a markup language. Output 28 includes symbols to identify particular phonemes of audio 14, symbols to identify silence of audio 14, and symbols (e.g., tags) to demarcate where the phonemes and silences occur. Output 28 may further include information regarding the length of each sound or silence. In the example of FIG. 2, recognition engine 22 sends output 28 to analysis module 40.

Referring again to FIG. 1, analysis module 40, upon receiving output 28, analyze output 28 to identify, for example, silent pauses, filled pauses, false starts, or other measurements. For example, analysis module 40 may calculate a number of silent pauses, a number of filled pauses, a mean or median duration of pauses (silent, filled, or both), silent pause frequency, hesitation frequency, hesitation duration, false start frequency, filled pause frequency, utterance duration, a standard deviation in the length of pauses, a ratio of total pause time to audio time (i.e., the total time of audio 14), rhythmic phrase length, or other calculations.

Analysis module 40 may calculate hesitation frequency and duration by determining a ratio of pauses to words (i.e., non-silent, non-filled pause segments). Analysis module 40 may calculate filled pause frequency and duration according to a count and mean duration of nasalized ("umm") and non-nasalized ("ahh") filled pause segments. Analysis module 40 may identify false start frequency by counting the number of instances of initial word fragments. Analysis module 40 may calculate a total disfluency rate as, for example, a combined count of filled pauses, false starts, and repetitions. Analysis module 40 may also determine initial pauses as the duration of a silent pause before speech initiation.

In one embodiment, analysis module 40 may require a silence to exceed a minimum duration before classifying the silence as a silent pause. For example, in one embodiment, analysis module 40 counts silences lasting more than 150 ms as silent pauses, whereas analysis module 40 classifies silences less than 150 ms as merely breaks between words.

To identify a silent pause, analysis module 40 may identify silence following a phoneme. To identify a filled pause, analysis module 40 may identify a phoneme or sequence of phonemes corresponding to a typical filled pause in the corresponding language that was used to construct acoustic model 16 and phoneme model 18. This sequence of one or more phonemes may generally be referred to as a filled pause phoneme sequence. As one example, analysis module 40 may determine that an open back unrounded phoneme (i.e., "uhh") or a similar phoneme (e.g., "ahh") are filled pause phonemes when these phonemes exist between two silences. As another example, analysis module 40 may determine that an open mid-back unrounded phoneme followed by a voiced bilabial nasal phoneme (i.e., "umm") between two silences is a filled pause phoneme sequence. Analysis module 40 may determine that other sounds constitute filled pauses as well, depending upon the modeled language of acoustic model 16 and phoneme model 18 and the speech being analyzed.

In one embodiment, analysis module 40 measures prosodic characteristics in accordance with methods described by Colin Wightman and Mori Ostendorf, *Automatic Recognition of Prosodic Phrases*, INTERNATIONAL CONFERENCE ON ACOUSTICS, SPEECH, AND SIGNAL PROCESSING, 1991, incorporated herein by reference. In one embodiment, analysis module 40 calculates:

$$\tilde{d}(i) = \frac{d(i) - \hat{\mu}_j(i)}{\sigma(j)}; \hat{\mu}_j(i) = \mu_j + \gamma(i)\sigma_j;$$

where d(i) is a duration of segment i of audio 14, σ(i) and μ(i) are, respectively, the mean and standard deviation of segment i of audio 14. The gamma coefficient (γ(i)) is computed according to:

$$\gamma(i) = \gamma(i-1) + \frac{1}{100}\left(\frac{1}{50}\sum_{j=i-50}^{i=1}\tilde{d}(j)\right);$$

Analysis module 40 then computes a difference of averaged normalized segment durations for each pair of adjacent words of audio 14. When the difference exceeds one standard deviation computed over all of audio 14, analysis module 40 determines that the segment corresponds to a rhythmic boundary.

Analysis module 40 may calculate various statistics and measurements from output 28. For example, analysis module 40 may analyze output 28 to identify a total number of pauses, a number of silent pauses, a number of filled pauses, an average (mean or median, or both) length of pauses (silent, filled, or both), a standard deviation of the length of pauses, a number of false starts, a duration of audio 14, or other measurements. Analysis module 28 may include any or all of these measurements in speech analysis 42. Analysis module 28 may output speech analysis 42 in the form of data sent to another module such as a diagnostic engine or report generator (as discussed with respect to, for example, FIG. 4), a flat file, data stored to a relational database, data transmitted over a network, or other formats.

Figure 3:
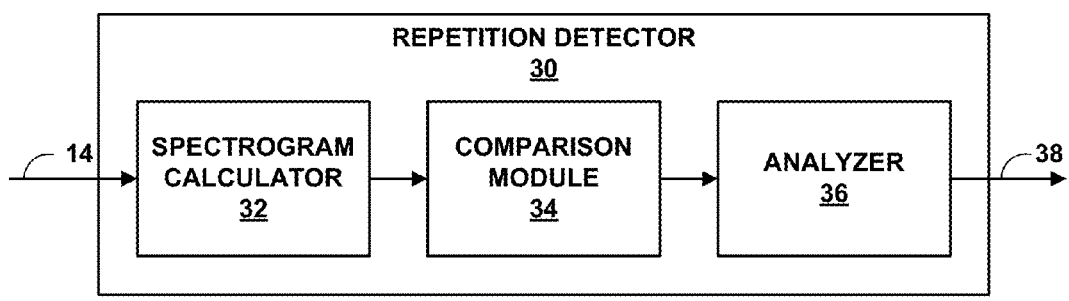
FIG. 3 is a block diagram illustrating an example embodiment of a repetition detector.

FIG. 3 is a block diagram illustrating an example embodiment of repetition detector 30. In the example of FIG. 3, repetition detector 30 includes spectrogram calculator 32, comparison module 34, and analyzer 36 to locate repetitions in audio 14 (FIG. 1). In general, repetition detector 30 identifies a portion of audio 14 and compares the identified portion to other portions of audio 14 to determine how similar the identified portion is to the other portion. In one embodiment, the identified portion may be a predetermined size, such as 10 ms. In one embodiment, the identified portion may correspond to a word, i.e., a sequence of one or more phonemes preceded by and preceding silence. In the example embodiment of FIG. 3, repetition detector 30 treats the identified portion as a sliding window that slides along audio 14 to select a portion for comparison of audio 14 of the same size as the sliding window, and comparison module 34 compares the identified portion to the portion for comparison. When the similarity between the identified portion and the portion for comparison exceed a minimum threshold (as determined by comparison module 34), repetition detector 30 determines that the compared portion is a repeat of the identified portion.

Repetition detector 30 identifies a portion of audio 14 to compare to other portions of audio 14. Spectrogram calculator 32 calculates a spectrogram from the identified portion. Spectrogram calculator 32 divides the identified portion into a number of frames, e.g., 100 frames. Spectrogram calculator 32 divides each frame into, for example, 128 bands each corresponding to frequencies of sound. The bands may be divided into a logarithmic scale, such as decibels (dB). Spectrogram calculator 32 then determines an intensity value for each band of each frequency of the identified portion of audio 14. Spectrogram calculator 32 stores the intensity values for the bands of the frames in a data structure, such as a three-dimensional matrix, a tree, a linked-list, or other suitable data structure.

Comparison module 34 compares the spectrogram of the identified portion to another portion of audio 14. In general, comparison module 34 treats the identified portion as a sliding window, comparing the identified portion to other portions of equal size of audio 14. To compare the identified portion with another portion, spectrogram calculator 32 calculates a spectrogram for the portion against which the identified portion is compared. Comparison module 34 compares the spectrogram of the identified portion with the spectrogram of the portion for comparison.

In one embodiment, comparison module 34 calculates a vector for each of the frames of each spectrogram. To compare a vector of the identified portion to a vector of the portion for comparison, comparison module 34 calculates an angle between the two vectors, such as by calculating a cosine between the two vectors. The calculated angle describes the similarity between the two vectors, and accordingly the two compared frames. Comparison module 34 performs this analysis for each frame of the identified portion and a corresponding frame of the portion for comparison. Comparison module 34 may then calculate a value to determine how similar the identified portion overall is to the portion for comparison. For example, comparison module 34 may calculate an average (e.g., mean) of the cosine values, aggregate the widths of the angles, or use other calculations to determine a similarity between the identified portion and the portion used for comparison.

Comparison module 34 determines whether the similarity between the identified portion and the compared portion represents a repetition of a sound or word. In one embodiment, comparison module 34 determines or is configured with a threshold for determining whether a similarity in the two portions corresponds to a repetition. When a value for the similarity exceeds the threshold, comparison module 34 determines that a repetition has occurred. When a repetition is detected, comparison module 34 sends a signal to analyzer 36 to indicate the occurrence of a repetition.

Analyzer 36 receives output from comparison module 34, in the example of FIG. 3. In one embodiment, analyzer 36 maintains a counter to count the total number of repetitions that have occurred. Analyzer 36 may also determine a repetition frequency (i.e., how often repetitions occur in audio 14) or other statistics regarding repetition.

In one embodiment, analyzer 36 uses the spectrogram calculated by spectrogram calculator 32 to determine a fundamental frequency of the patient's speech. Analyzer 36 then hypothesizes as to the patient's intonation for the identified portion of audio 14. For example, analyzer 36 may identify fluctuations in the fundamental frequency. Analyzer 36 may include fundamental frequency and intonation analysis in output 38. In another embodiment, another module may calculate the fundamental frequency of the patient's speech. For example, spectrogram calculator 32 may exist as a separate module that sends spectrograms to repetition detector 30 and a fundamental frequency determination module.

After repetition detector 30 has analyzed audio 14, analyzer 36 may send output 38 to analysis module 40 (FIG. 1). In other embodiments, analyzer 36 may send output 38 to a database, write output 38 as a flat file, transmit output 38 over a network, or send output 38 to other modules. Upon receiving output 38, analysis module 40 (FIG. 1) may include data of output 38 in speech analysis 42. For example, analysis module 40 may include a number of repetitions of audio 14 in speech analysis 42. Analysis module 40, or analyzer 36, may also calculate a repetition frequency as the number of instances where one, two, or three words are repeated, for example. The repetition frequency may include a repetition of sounds, words, filled pauses, or false starts. Analysis module 40 may include the calculated repetition frequency in speech analysis 42. Analysis module 40 may also use repetitions detected by repetition detector 30 to determine homogeneity of the speech sample of audio 14.

Figure 4:
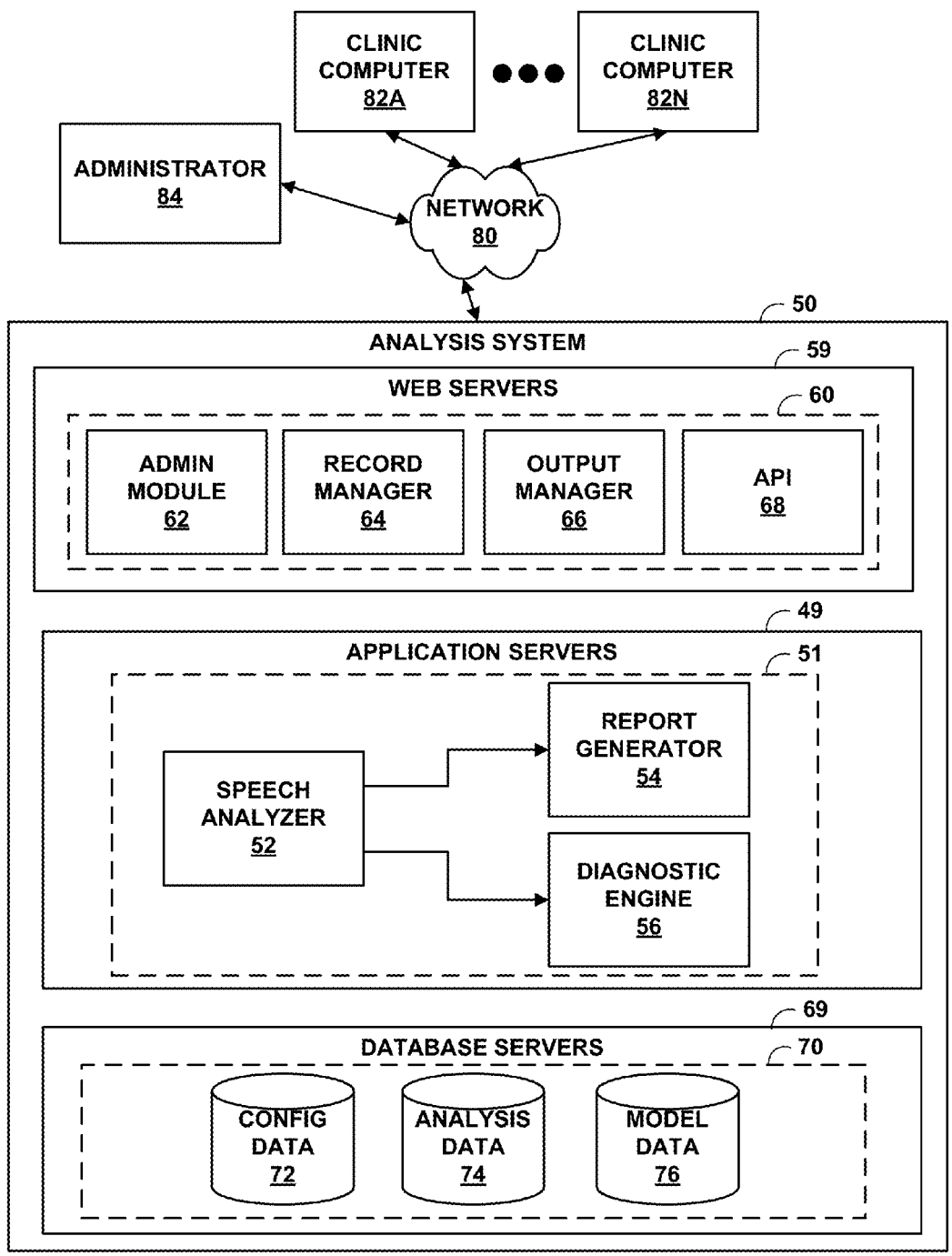
FIG. 4 is a block diagram illustrating an example analysis system.

FIG. 4 is a block diagram illustrating an example analysis system 50. Analysis system 50 includes web servers 59, application servers 49, and database servers 69. Application servers 49 include software modules 51 that include speech analyzer 52, which may correspond to speech analyzer 20 of FIG. 1. Speech analyzer 52 may interact with reference data 76, which may correspond to each of acoustic model 16 and phoneme model 18 of FIG. 1. In general, analysis system 50 receives audio samples from one or more of clinic computers 82A-82N (clinic computers 82), analyzes the audio samples using speech analyzer 20, and generates output to be returned to the corresponding one of clinic computers 82. Speech analyzer 52 may store output to analysis database 74. The output returned to clinic computers 82 may correspond to speech analysis 42 of FIG. 1. In the example embodiment of FIG. 4, analysis system 50 further includes report generator 54 and diagnostic engine 56.

Report generator 54, also included in software modules 51, receives output of speech analyzer 52 and generates a report thereof to be returned to one of clinic computers 82. In one embodiment, report generator 54 may generate a report containing historical data for a corresponding patient, retrieved from analysis data 74. Report generator 54 may generate one or more reports that include one or more measures of disfluencies of a patient's speech. For example, report generator 54 may generate a report that includes a duration of the patient's speech, a total number of pauses, a number of silent pauses, a number of filled pauses, a frequency of pauses, an average (mean, median, or both) duration of pauses, a standard deviation for the duration of pauses, a number of false starts, a frequency of false starts, a number of repetitions, a frequency of repetitions, or other measurements. Report generator 54 may normalize these measures to the duration of the audio sample from which they were measured. When a particular patient has provided a number of audio samples, report generator 54 may generate a report indicating averages for these measures or a change over time in these measures (e.g., an increasing trend in the number of pauses, a decreasing trend in the number of repetitions, etc.).

Diagnostic engine 56, also included in software modules 51, receives output of speech analyzer 52 and generates one or more potential diagnoses based on the received output. The diagnosis may be returned to one of clinic computers 82. Diagnostic engine 56 may base the diagnosis on current output of speech analyzer 52, as well as historical data for a corresponding patient, retrieved from analysis data 74. In generating a diagnosis, diagnostic engine 56 may compare a number of disfluencies of a particular patient to an average number of disfluencies for an average patient; the average patient may be a patient without a speech impairment or a patient who has a speech impairment, depending upon the diagnostic approach. In one embodiment, diagnostic engine 56 may normalize the number of disfluencies identified over the total duration of audio 14, to better quantify and analyze the number of detected disfluencies. In one embodiment, diagnostic engine 56 may focus on certain categories of disfluencies more than others for particular diagnoses.

Although illustrated as "server side" software modules 51 provided by analysis system 50, software modules 51 could readily be implemented as "client-side" software modules executing on computing devices used by, for example, users of clinic computers 82A-82N (clinic computers 82). Software modules 51 could, for example, be implemented as Active X modules executed by a web browser executing on one or more of clinic computers 82.

Analysis system 50 also includes web servers 59, which provide access to communication software modules 60. Communication software modules 60 include administration (admin) module 62, record manager 64, output manager 66, and application programming interface (API) 68. Admin module 62 presents an interface by which authorized users, such as administrator 84, configure analysis system 50. Administrator 84 may, for example, manage accounts for users at clinics corresponding to clinic computers 82, including setting access privileges, creating new accounts, removing old accounts, or other administrative functions. Admin module 62 may enable administrator 84 to manage and store account information, such as particular customer accounts, user privileges, and other data, in configuration database (config data) 72.

Record manager 64 allows users of clinic computers 82 to define analyses, reports, patient records, or other clinical data for use by a clinician or patient. Furthermore, record manager 64 allows a user to set various characteristics and properties for an analysis. Record manager 64 may also keep track of billing records, received payments, or other information in, for example, config data 72. In one embodiment, users of clinic computers 82 may be billed based on a number of analyses sent to analysis system 50. In one embodiment, users of clinic computers 82 may be billed based on a duration of all audio sent to analysis system 50 by the corresponding one of clinic computers 82. Users of clinic computers 82 may also be billed based on other measurements.

Output manager 66 controls aspects of report or analysis generation that is sent to clinic computers 82. After a user of one of clinic computers 82 has uploaded an audio sample to analysis system 50 via network 80, output manager 66 returns output from speech analyzer 52, report generator 54, diagnostic engine 56, or other modules of analysis system 50 to the corresponding one of clinic computers 82.

Application programming interface (API) 68 provides the ability to establish direct connections with external computing devices, allowing such devices to automatically control analysis system 50. A front-end module, such as a script or command line interface provided by the remote computing device, for example, may communicate with API 68 directly, bypassing the interfaces presented by other software modules 60. In this manner, the front-end module can automatically interact with analysis system 50 and control output. As a result, API 68 can be useful when connecting to internal corporate systems to incorporate, for example, analysis information.

Analysis system 50 also includes database servers 69 that provide access to databases 70. Databases 70 include configuration (config) data 72, analysis data 74, and model data 76. Config data 72, as explained above, stores records corresponding to users of clinic computers 82, billing records, billing reports, access privileges, client information, patient information, and other information regarding the configuration of analysis system 50. Analysis data 74 stores present and historical analyses from various patients at clinics corresponding to clinic computers 82. Software modules 51 may retrieve data from analysis data 74, for example to compare a present analysis with historical analyses for a patient. Model data 76 may store modeling data, such as modeling data of acoustic model 16 and phoneme model 18 (FIG. 1). Model data 76 may store other models as well, such as a language model for identifying particular morphemes or words of an audio sample or models corresponding to patients with speech impairments.

Figure 5:
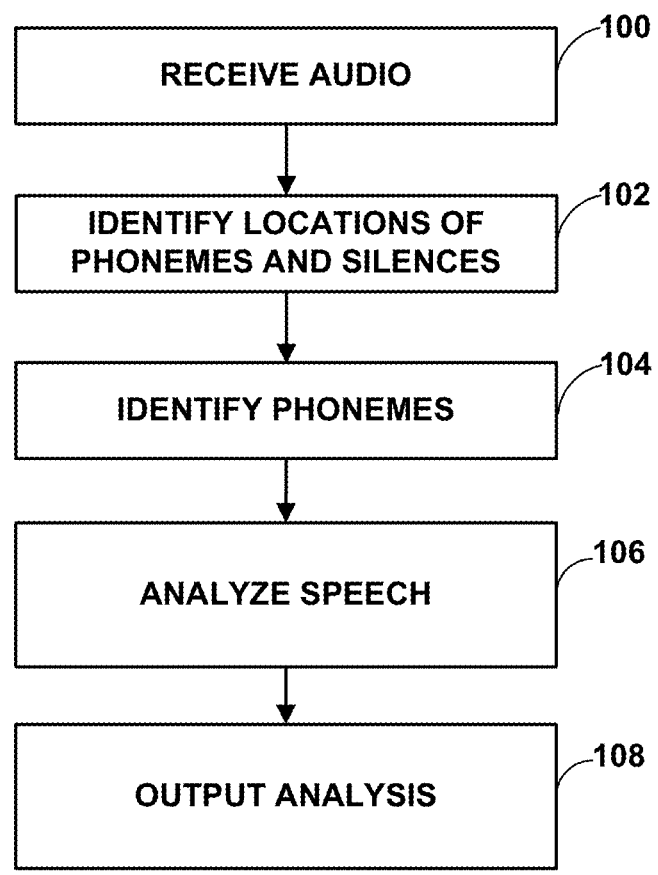
FIG. 5 is a flowchart illustrating an example method for automatically measuring fluency of a patient's speech.

FIG. 5 is a flowchart illustrating an example method for automatically measuring fluency of a patient's speech. Although the example method of FIG. 5 is described with respect to the example speech analyzer 20 of FIG. 1, any device or module may perform a similar method for automatically measuring fluency of a patient's speech. Initially, speech analyzer 20 receives audio 14 (100). Audio 14 may be, for example, live speech from a patient, a recording of speech from a patient, a data file including speech from a patient, a transmission over a network that includes speech from a patient, or other means for delivering an audio sample of speech from a patient. In general, audio 14 includes continuous, spontaneous speech from the patient.

Speech analyzer 20 passes audio 14 as input to recognition engine 22. Speech analyzer 20 may also pass audio 14 as input to repetition detector 30, as discussed with respect to, for example, FIG. 7. In any case, recognition engine 22 may first pass audio 14 to audio tokenizer 24. Audio tokenizer 24 analyzes audio 14 to identify locations of phonemes, non-phonemic noise, and silence (102). Audio tokenizer 24 produces a token for each phoneme, non-phonemic noise, and silence. For example, audio tokenizer 24 may analyze a first portion of audio 14 to determine whether the first portion of audio 14 corresponds to a phoneme, white noise, or silence. Audio tokenizer 24 may then retrieve data from audio 14 until a new category is reached. For example, when audio tokenizer 24 first perceives silence in audio 14, audio tokenizer 24 continues to retrieve data from audio 14 until either a phoneme or white noise is detected. Audio tokenizer 24 then classifies the silence as a "silence" token, including a duration of the silence.

To detect boundaries of phonemes, audio tokenizer 24 may retrieve data from acoustic model 16. Audio tokenizer 24 may further use data from acoustic model 16 to distinguish phonemes from white noise, i.e., non-phonemic sounds. Upon detecting a particular phoneme, audio tokenizer 24 may continue to retrieve data from audio 14 until either a silence or white noise is detected. Audio tokenizer 24 may then classify the phoneme as a "phoneme" token, including a duration of the phoneme.

After audio tokenizer 24 has tokenized audio 14, audio parser 26 may parse the tokens to identify particular phonemes for each phoneme token (104). In one embodiment, audio parser 26 may instead call a function of audio tokenizer 24, e.g., "tokenizer.getNextToken( )." In any case, upon receiving a phoneme token, audio parser 26 identifies the particular phoneme of the phoneme token. To do so, audio parser 26 refers to phoneme model 18. In general, a phoneme token is merely an expression that a phoneme is present, whereas audio parser 26 may particularly identify the phoneme of the token. For example, if the phoneme token corresponds to an "m" sound of audio 14, audio tokenizer 24 may identify that a phoneme token exists in a particular location of audio 14, whereas audio parser 26 may particularly identify that phoneme token as "m," i.e., a voiced bilabial nasal phoneme.

Audio parser 26 outputs a series of tagged symbols. For example, for each phoneme, audio parser 26 may output a tag to indicate the beginning of the phoneme, an identifier of the phoneme, and a tag to indicate the end of the phoneme. Audio parser 26 may further indicate in the beginning and ending tags the time corresponding to audio 14 of the beginning and the ending of the phoneme. Likewise, audio parser 26 may include tags for the beginning and ending of each silence, which may further indicate the duration of the silence. In one embodiment, audio parser 26 may discard white noise. In another embodiment, audio parser 26 may include tags to mark white noise and indicate white noise as such. In one embodiment, audio parser 26 may send output to a database. In another embodiment, audio parser 26 may send output to a flat file. In another embodiment, audio parser 26 may direct its output as input to a module, such as analysis module 40. In another embodiment, audio parser 26 may return its output to recognition engine 22, which may then direct the output to analysis module 40.

Analysis module 40 may either retrieve or receive output from recognition engine 22 to analyze the sequence of tagged symbols produced by recognition engine 22 (106). Analysis module 40 may analyze the sequence of tagged symbols to analyze various characteristics of the patient's speech. In one embodiment, analysis module 40 may analyze the patient's speech in accordance with the example method of FIG. 6, as discussed below. In other embodiments, analysis module 40 may perform other analyses of the patient's speech. In general, analysis module 40 may automatically measure fluency of the patient's speech. That is, analysis module 40 may identify various characteristics of the patient's speech to determine a number of disfluencies, such as silent pauses, filled pauses, hesitations, false starts, and other disfluencies.

Analysis module 40 generates output in the form of speech analysis 42, in the example of FIG. 1 (108). Analysis module 40 may output speech analysis 42 to a database, a flat file, transmit speech analysis 42 over a network, pass speech analysis 42 as input to a module, or utilize speech analysis 42 in some other manner. Analysis module 40 may also receive input from repetition detector 30 before generating speech analysis 42, in one embodiment.

Figure 6:
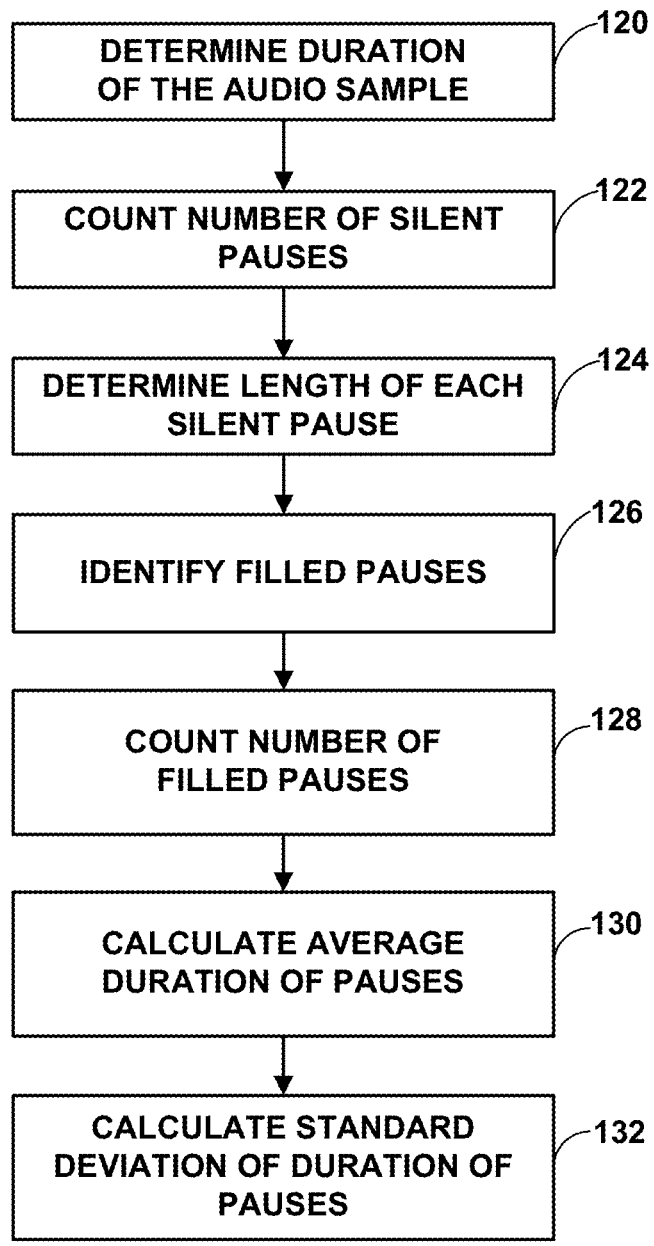
FIG. 6 is a flowchart illustrating an example method for analyzing speech of a patient.

FIG. 6 is a flowchart illustrating an example method for analyzing speech of a patient. In one embodiment, the method of FIG. 6 may correspond to step (106) of FIG. 5, although the method of FIG. 6 may be performed at a different time or by a different module, i.e., by a device or module other than analysis module 40 of FIG. 1.

In the example of FIG. 6, analysis module 40 first determines a duration of audio 14 (120). Analysis module 40 may normalize analyses in accordance with the duration of audio 14. Analysis module 40 may also calculate certain measurements in view of the duration of audio 14, such as frequencies of pauses or false starts.

Analysis module 40 also calculates a number of silent pauses of audio 14 (122). Analysis module 40 may examine the tagged sequence produced by audio parser 26 to identify each tag corresponding to a silent pause. For each tag indicating a beginning of a silent pause, analysis module 40 may increment a silent pause counter. Analysis module 40 also determines the duration of each detected silent pause (124). Analysis module 40 may add the duration of each detected silent pause to a silent pause duration aggregator.

Analysis module 40 also identifies filled pauses from the parsed output of audio parser 26 (126). In general, filled pauses are sounds people make during speech that indicate that further speech is forthcoming. Common examples of filled pauses among English language speakers are "umm" and "ahh." To identify a filled pause, analysis module 40 may utilize a grammar when examining the tagged sequence produced by audio parser 26. The grammar may specify a filled pause as a phonetic sequence such as:

<Filled_Pause> = <silence> <Filled_Pause_Phoneme_Sequence> <silence>
<Filled_Pause_Phoneme_Sequence> = <FP_Vowel> [<FP_Consonant>]
<FP_Vowel> =ɑ∧|ɜ| cə
<FP_Consonant> = m | n In the example grammar shown above, angle brackets "<" and ">" indicate a class, square brackets "[" and "]" indicate "optional," unbracketed single symbols (e.g., "ɑ", "∧", and "m") indicate phonetic symbols, and "|" indicates "or." Analysis module 40 may use other grammars to identify filled pauses as well; the grammar shown above is merely one example of a possible grammar. As analysis module 40 identifies filled pauses, analysis module 40 may maintain a count of the number of filled pauses identified of audio 14 (128). In addition, analysis module 40 may determine a duration of filled pauses. The duration may include the duration of the silences before and after a filled pause phoneme sequence, as well as the duration of the filled pause phoneme sequence itself.

Analysis module 40 then determines an average duration of pauses (130). Analysis module 40 may determine a set of averages, such as an average duration of silent pauses, an average duration of filled pauses, and an average duration of all pauses (silent and filled). To find an average, analysis module aggregates the durations of pauses and divides the aggregated duration by the number of pauses. Analysis module 40 also calculates the standard deviation of the duration of pauses (132).

Figure 7:
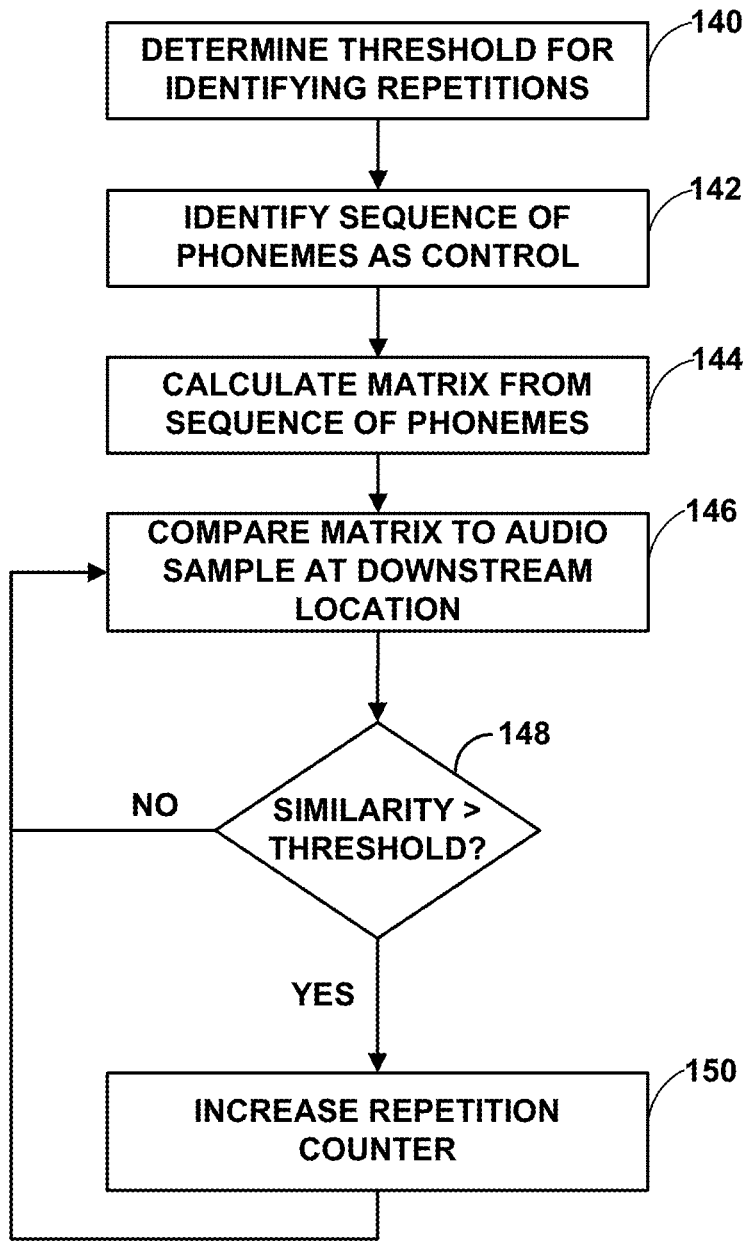
FIG. 7 is a flowchart illustrating an example method for identifying repetitions in an audio sample taken from a patient.

FIG. 7 is a flowchart illustrating an example method for identifying repetitions in an audio sample taken from a patient. Although discussed with respect to repetition detector 30 of FIG. 1, any device or module may apply the method of FIG. 7 to identify repetitions in an audio sample. Initially, repetition detector 30 determines a threshold for a comparison between two portions of audio 14 to determine whether the two portions are similar enough to constitute a repetition (140). For example, in one embodiment, the threshold may be 0.80.

Repetition detector 30 may then select a portion of audio 14 to use as a control for a sliding window that slides down audio 14 (142). This control portion will be compared with other portions of audio 14 to determine how similar the control portion is to the compared portion. The control portion may include a sequence of phonemes before and after silence of audio 14. The control portion may represent a word, a phonemic portion of a filled pause, or a fixed length portion of audio 14.

Spectrogram calculator 32 calculates a spectrogram for the control portion of audio 14 (144). An example spectrogram is discussed with respect to FIG. 8. To create a spectrogram from the control portion, spectrogram calculator 32 first divides the control portion into a number of frames, e.g., 100 frames. Spectrogram calculator 32 then divides each frame into a set of 128 frequency bands. The bands may be linear, logarithmic, or some other division among the frequencies. Other embodiments may also use different numbers of bands and frames. In any case, for each band of each frame, spectrogram calculator 32 determines a value from the control portion of audio 14 corresponding to the frequency at that frame. Once spectrogram calculator 32 has determined a value for each band of each frame, spectrogram calculator 32 may store the values in a data structure, such as a three-dimensional matrix. In other embodiments, spectrogram calculator 32 may store the values in a different data structure, such as a linked list, a tree, or other suitable data structure.

Comparison module 34 may then compare the spectrogram of the control portion to a comparison portion of audio 14 (146). Spectrogram calculator 32 calculates a spectrogram for the comparison portion of audio 14. Comparison module 34 then compares the two spectrograms to determine a similarity value. In one embodiment, for example, comparison module 34 treats each frame of the matrix as a vector, i.e., an array of values. Comparison module 34 then calculates a cosine angle between a vector of the control portion and a corresponding vector of the comparison portion for each of the vectors. Comparison module 34 then computes an average of the cosine angles to determine a value for similarity between the control portion and the comparison portion.

Comparison module 34 then compares the similarity value to the threshold (148). When comparison module 34 determines that the similarity value is less than the threshold ("NO" branch of 148), comparison module 34 determines that there is not a repetition, so comparison module 34 compares the control portion to another comparison portion of audio 14, e.g., one or more frames downstream of audio 14. However, when comparison module 34 determines that the similarity value is greater than the threshold ("YES" branch of 148), analyzer 36 increments a repetition counter (150). Comparison module 34 then compares the control portion to another portion of audio 14 past the comparison portion that was determined to be a repetition.

Figure 8:
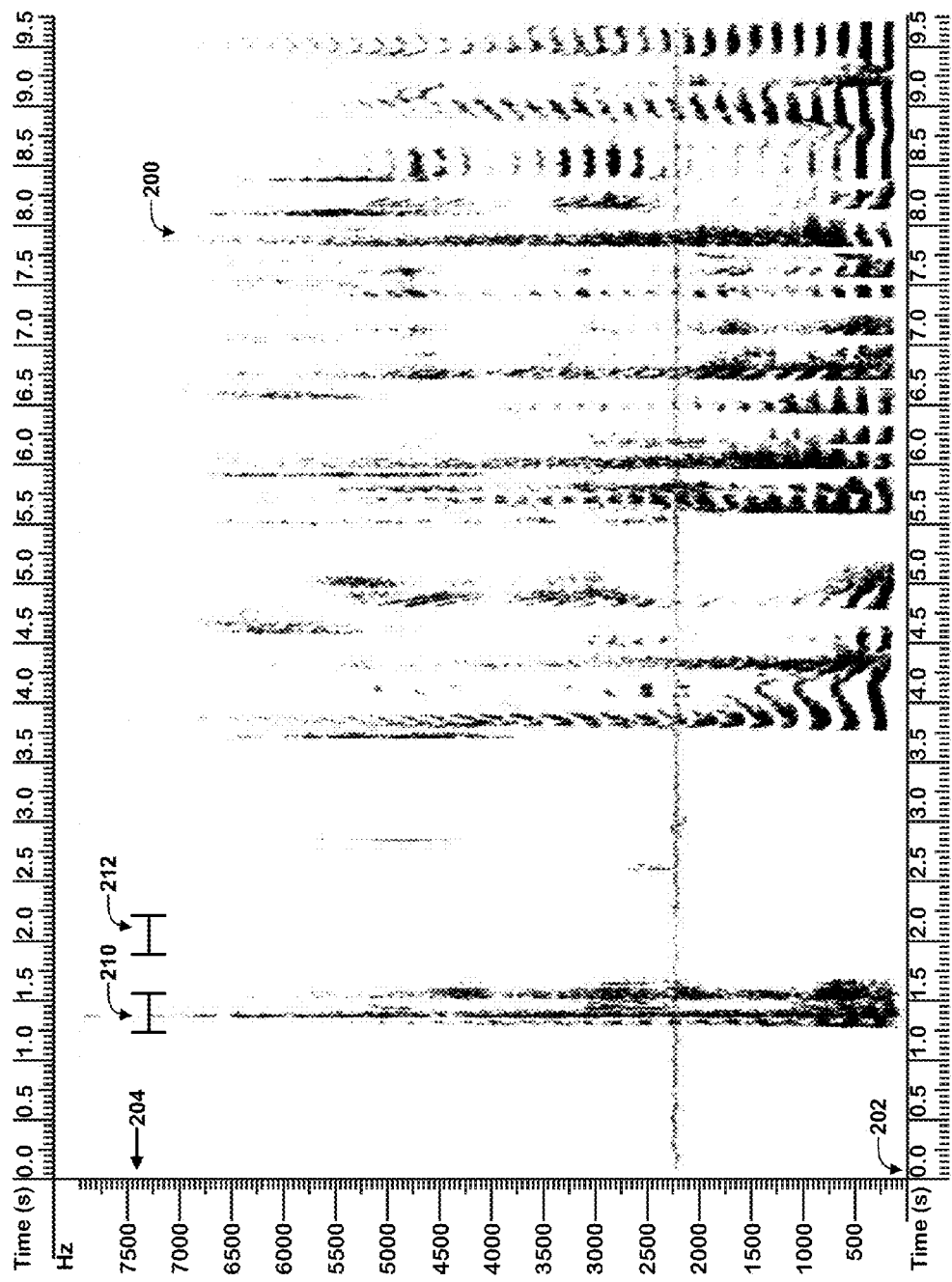
FIG. 8 is an example spectrogram created from a sample of speech, collected from a patient with aphasia, by a spectrogram calculator.

FIG. 8 is an example spectrogram 200 created from a speech sample, collected from a patient with aphasia, by spectrogram calculator 32 (FIG. 3). Time axis 202, as the x-axis, indicates a time corresponding to the speech sample. Hertz (Hz) axis 204, as the y-axis, indicates various frequencies of the speech sample. Points on spectrogram 200, given by an x-coordinate (corresponding to time) and a y-coordinate (corresponding to Hz), i.e., point (x, y), can be displayed as either white or black. When a sound of frequency y occurs at time x, the point (x, y) is displayed as black, but when a sound of frequency y does not occur at time x, point (x, y) is displayed as white.

Comparison module 34 compares portions of a spectrogram, such as spectrogram 200, to other portions thereof to identify repetitions. For example, comparison module 34 may identify region 210, ranging from time 1.3 s to 1.65 s, and compare region 210 across time axis 202 to other portions of spectrogram 200. Comparison module 34 may compare region 210 to region 212 (ranging from time 2.0 s to 2.35 s, for example, and determine that no repetition is detected between region 210 and region 212, in accordance with the techniques described herein. After comparing region 210 to region 212, comparison module 34 compares region 210 to a next region. In one embodiment, the next region begins at the edge of the previously compared region, e.g., 2.35 s (the end of region 212). In another embodiment, when no repetition is detected from the previously compared region, the next region begins within the previously compared region, e.g., 2.05 s (within region 212). In this manner, and in accordance with the techniques described herein, a sample region is treated as a sliding window that slides along time axis 202 and is compared against other regions of a spectrogram, such as spectrogram 200.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components, embodied in programmers, such as physician or patient programmers, stimulators, image processing devices or other devices. The term "processor" or "processing circuitry" may generally refer to any of the foregoing logic circuitry, alone or in combination with other logic circuitry, or any other equivalent circuitry.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described herein may also be embodied in a computer readable medium containing instructions. Instructions embedded in a computer readable medium may cause a programmable processor, or other processor, to perform the method, e.g., when the instructions are executed. A computer readable medium may be a computer readable storage medium. Computer readable storage media may include, for example, random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The invention claimed is:

1. A method comprising:
receiving, with a speech analysis device, an audio sample that includes speech of a patient;
analyzing, with the speech analysis device, the audio sample to identify phonemes from the speech of the patient;
analyzing, with the speech analysis device, the identified phonemes to identify prosodic characteristics of the speech of the patient; and
automatically measuring, with the speech analysis device, fluency of the speech of the patient based on the prosodic characteristics.

2. The method of claim 1, wherein analyzing the identified phonemes to identify prosodic characteristics comprises identifying pauses between the identified phonemes of the speech of the patient from the audio sample.

3. The method of claim 2, wherein identifying pauses comprises identifying silent pauses between the identified phonemes.

4. The method of claim 2, wherein identifying pauses comprises identifying filled pauses that include at least one filled pause phoneme.

5. The method of claim 2, wherein automatically measuring fluency comprises counting a number of pauses that occur in the speech of the patient of the audio sample.

6. The method of claim 5, wherein counting a number of pauses comprises counting a number of silent pauses and counting a number of filled pauses.

7. The method of claim 2, wherein automatically measuring fluency comprises identifying a frequency of pauses of the speech of the patient of the audio sample.

8. The method of claim 2, wherein automatically measuring fluency comprises identifying an average duration of pauses of the speech of the patient of the audio sample.

9. The method of claim 1, wherein analyzing the identified phonemes to identify prosodic characteristics comprises identifying repetitions of one or more of the identified phonemes.

10. The method of claim 9, wherein automatically measuring fluency comprises counting a number of repetitions that occur in the identified phonemes.

11. The method of claim 9, wherein identifying repetitions comprises:
calculating a first spectrogram for a first portion of the audio sample;
calculating a second spectrogram for a second portion of the audio sample;
comparing the first spectrogram to the second spectrogram to determine similarity between the first spectrogram and the second spectrogram; and determining that the second portion is a repetition of the first portion when the similarity between the first spectrogram and the second spectrogram exceeds a threshold.

12. The method of claim 11, wherein comparing the first spectrogram to the second spectrogram comprises:
computing a cosine angle between each of a plurality of vectors of the first spectrogram and a corresponding one of a plurality of vectors of the second spectrogram;
determining a mean of the computed cosine angles; and
determining that the similarity between the first spectrogram and the second spectrogram is the computed mean of the determined cosine angles.

13. The method of claim 1, wherein analyzing the identified phonemes to identify prosodic characteristics comprises identifying a fundamental frequency of the identified phonemes.

14. The method of claim 1, further comprising diagnosing a disorder of the patient according to the fluency of the speech of the patient.

15. The method of claim 14, wherein the disorder comprises at least one of fronto-temporal dementia, Alzheimer's disease, schizophrenia, epilepsy, an autism spectrum disorder, and a side effect caused by medication.

16. The method of claim 1, further comprising monitoring changes in the fluency of the speech of the patient over time.

17. The method of claim 16, further comprising modifying a therapy regimen based on changes in the fluency of the speech of the patient.

18. The method of claim 1, further comprising determining efficacy of a drug based on the fluency of the speech of the patient.

19. A non-transitory computer-readable storage medium comprising instructions for causing a programmable processor to:
receive an audio sample that includes speech of a patient;
analyze the audio sample to identify phonemes from the speech of the patient;
analyze the identified phonemes to identify prosodic characteristics of the speech of the patient; and
automatically measure fluency of the speech of the patient based on the prosodic characteristics.

20. A method comprising:
providing an audio sample that includes speech of a patient to a speech analysis device, wherein the speech analysis device analyzes the audio sample to identify phonemes from the speech of the patient and to analyze the identified phonemes to identify prosodic characteristics of the speech of the patient and automatically measures fluency of the speech of the patient based on the prosodic characteristics; and
receiving an indication of the fluency of the speech of the patient from the speech analysis device.

21. The method of claim 20, further comprising diagnosing a disorder of the patient according to the fluency of the speech of the patient.

22. The method of claim 21, wherein the disorder comprises at least one of fronto-temporal dementia, Alzheimer's disease, schizophrenia, epilepsy, an autism spectrum disorder, and a side effect caused by medication.

23. The method of claim 20, further comprising monitoring changes in the fluency of the speech of the patient over time.

24. The method of claim 23, further comprising modifying a therapy regimen based on changes in the fluency of the speech of the patient.

25. The method of claim 20, further comprising determining efficacy of a drug based on the fluency of the speech of the patient.

* * * * *